United States Patent
Yang et al.

(10) Patent No.: US 9,714,182 B2
(45) Date of Patent: *Jul. 25, 2017

(54) PHOSPHORUS-FREE CORROSION AND SCALE INHIBITOR USED IN CIRCULATING COOLING WATER OF CENTRAL AIR CONDITIONING AND ITS PREPARATION METHOD

(71) Applicant: GUANGZHOU SPECIAL PRESSURE EQUIPMENT INSPECTION AND RESEARCH INSTITUTE, Guangzhou (CN)

(72) Inventors: Bo Yang, Guangzhou (CN); Maodong Li, Guangzhou (CN); Zhigang Chen, Guangzhou (CN); Wenxian Huang, Guangzhou (CN); Lin Yang, Guangzhou (CN); Jinmei Lin, Guangzhou (CN); Wen Yu, Guangzhou (CN); Shiping Li, Guangzhou (CN); Hui Zhang, Guangzhou (CN); Yuhui Du, Guangzhou (CN); Xiedong Lin, Guangzhou (CN); Zhenling Wu, Guangzhou (CN)

(73) Assignee: GUANGZHOU SPECIAL PRESSURE EQUIPMENT INSPECTION AND RESEARCH INSTITUTE (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/109,282

(22) PCT Filed: Dec. 1, 2014

(86) PCT No.: PCT/CN2014/092663
§ 371 (c)(1),
(2) Date: Jun. 30, 2016

(87) PCT Pub. No.: WO2015/101124
PCT Pub. Date: Jul. 9, 2015

(65) Prior Publication Data
US 2016/0318783 A1    Nov. 3, 2016

(30) Foreign Application Priority Data
Jan. 3, 2014  (CN) .......................... 2014 1 0003753

(51) Int. Cl.
C02F 5/10      (2006.01)
C02F 5/12      (2006.01)
C02F 5/14      (2006.01)
C02F 5/08      (2006.01)
C09K 15/32     (2006.01)
C23F 11/18     (2006.01)
C02F 103/02    (2006.01)
F28F 19/00     (2006.01)
F28F 23/00     (2006.01)
F24D 19/00     (2006.01)

(52) U.S. Cl.
CPC .............. *C02F 5/125* (2013.01); *C02F 5/083* (2013.01); *C09K 15/328* (2013.01); *C23F 11/187* (2013.01); *C02F 2103/023* (2013.01); *F24D 19/0092* (2013.01); *F28F 19/00* (2013.01); *F28F 23/00* (2013.01)

(58) Field of Classification Search
None
See application file for complete search history.

(56) References Cited

U.S. PATENT DOCUMENTS

| | | | | |
|---|---|---|---|---|
| 4,089,796 A * | 5/1978 | Harris | ..................... | C23F 11/08 |
| | | | | 210/698 |
| 5,525,257 A * | 6/1996 | Kleinstuck | ................ | C02F 5/10 |
| | | | | 210/698 |
| 5,788,857 A * | 8/1998 | Yang | ................... | C23F 11/1676 |
| | | | | 210/699 |
| 6,572,789 B1 * | 6/2003 | Yang | ........................ | C02F 5/14 |
| | | | | 252/387 |
| 9,290,850 B2 * | 3/2016 | Erickson | ................. | C23F 11/08 |
| 2007/0020109 A1 * | 1/2007 | Takahashi | ............... | C02F 1/481 |
| | | | | 417/48 |
| 2010/0108287 A1 * | 5/2010 | Ota | ...................... | A01K 13/006 |
| | | | | 165/46 |
| 2015/0118103 A1 * | 4/2015 | Erickson | ................. | C23F 11/08 |
| | | | | 422/7 |
| 2015/0284859 A1 * | 10/2015 | Erickson | ................. | C23F 11/08 |
| | | | | 252/389.23 |
| 2016/0318783 A1 * | 11/2016 | Yang | ....................... | C02F 5/083 |

FOREIGN PATENT DOCUMENTS

| | | |
|---|---|---|
| CN | 1754844 A | 4/2006 |
| CN | 1785853 A | 6/2006 |
| CN | 101066811 A | 11/2007 |
| CN | 102718329 A | 10/2012 |
| CN | 103332797 A | 10/2013 |
| CN | 103420495 A | 12/2013 |

* cited by examiner

Primary Examiner — Joseph D Anthony
(74) Attorney, Agent, or Firm — Schmeiser, Olsen & Watts, LLP

(57) ABSTRACT

A phosphorus-free corrosion and scale inhibitor used in circulating cooling water of central air conditioning is provided, which contains tourmaline, green corrosion and scale inhibitor, zinc salt and the like, wherein the content of the tourmaline is 5-500 g/t (calculated based on solid form); the content of the green corrosion and scale inhibitor is 5-50 g/t (calculated based on liquid form); and the content of the zinc salt is 0.2-0.8 g/t (calculated based on solid form), wherein the tourmaline includes dravite, schorlite, elbaite, manganese tourmaline, uvite or the like. The green corrosion and scale inhibitor contains any one, or two or three of polyaspartic acid, polyepoxysuccinic acid and polymaleic acid. Copper corrosion can be effectively inhibited by adding 0.2-2 g/t of benzotriazole (calculated based on solid form) into copper-containing devices. Also disclosed is a method of preparing the phosphorous-free corrosion and scale inhibitor used in circulating cooling water of central air conditioning.

9 Claims, No Drawings

PHOSPHORUS-FREE CORROSION AND SCALE INHIBITOR USED IN CIRCULATING COOLING WATER OF CENTRAL AIR CONDITIONING AND ITS PREPARATION METHOD

CROSS-REFERENCE TO RELATED APPLICATIONS

This application claims priority to PCT Application No. PCT/CN2014/92663, having a filing date of Dec. 1, 2014, based off of Chinese application No. 201410003753.8 having a filing date of Jan. 3, 2014, the entire contents of which are hereby incorporated by reference.

FIELD OF TECHNOLOGY

The following relates to a corrosion and scale inhibitor, and in particular to a phosphorus-free corrosion and scale inhibitor used in circulating cooling water of central air conditioning and its preparation method.

BACKGROUND

A circulating water system of central air conditioning generally comprises a cooling water system, a chilled water system and a heating water system, wherein the circulating cooling water system is generally open, and the chilled water and the heating water systems are mostly enclosed. In the open circulating cooling water system, as water contacts with the atmosphere constantly, the content of dissolved oxygen increases, which is likely to cause the electrochemical corrosion; $CaCO_3$ in water is more likely to scale and separate out on the conduction surface with the gradual increase of the salt content of the circulating water in the process of the continuous evaporation of cooling water, and with the degassing of $CO_2$. The cooling water absorbs such a great deal of dust, sand and the like in the air while contacting with the air that the sludge in the system accumulate. In addition, lighting, right temperature and sufficient oxygen and nutrient in the cooling tower are all beneficial to the growth of bacteria and algae, and the concentration of microorganisms and their nutrient sources increase with the circulating concentration, so that slime in the system increase.

The Corrosion, scale and slime mentioned above are not isolated but interrelated with one another. For example, salt deposits and dirt are generally combined together, and corrosion can be caused or aggravated by scale and slime. Therefore, the main task of circulating cooling water treatment is to eliminate or reduce damage caused by scale, corrosion and biological slime.

Generally speaking, the water used in a central air conditioning water system is classified into three types, namely, untreated tap water, softened water and deionized water. The water quality of tap water varies from region to region. In coastal regions of South China, the water qualities of tap water are of ultra-low hardness and high corrosiveness, with water hardness less than 20 mg/L (in $CaCO_3$, the same below), the total alkalinity less than 50 mg/L, and the pH value about 6. In softened water, however, scaling ions such as $Ca^{2+}$ and $Mg^{2+}$ are removed, and corrosive ions such as $Na^+$ and $Cl^-$ are added, which will not generate the scale, but aggravate the corrosion. Although deionized water has no scaling irons or corrosive ions, it has dissolved oxygen, so the corrosion process can be slow at first and accelerates gradually.

The patent CN103420495A discloses a preparation method and application of a central air-conditioning circulating water scale inhibitor, which is a copolymer prepared by the polymerization of certain amounts of alkyl glycol ether, maleic anhydride and other polymerizable monomers. The patent CN1754844A discloses an acid antiscaling agent used in circulating water of central air-conditioning. The acid antiscaling agent comprises ethylene diamine tetraacetic acid, sodium humate, polyphosphates and water. The two inhibitors above focus on scale inhibition, and pay little attention to corrosion inhibition. The patent CN102718329A discloses a composite corrosion and scale inhibitor of ultra-low hardness circulating cooling water, and a preparation method of the composite corrosion and scale inhibitor, which consists of amino tri-methylene phosphonic acid, etidronic acid, diethylenetriaminepenta acid and the like. The patent CN103332797A discloses a phosphorus-free corrosion and scale inhibitor used in circulating cooling water and the application thereof. The phosphorus-free corrosion and scale inhibitor consists of a non-enzymatic browning reaction product, a phosphorus-free scale inhibitor, a sulfonyl copolymer, zinc salt and water. Although the above two inhibitors adopt low phosphonic or phosphonic-free treatments, their complex formulae and the operation methods fail to meet the comprehensive requirements of the circulating cooling water system on corrosion inhibition, scale inhibition, sterilization and bacteriostasis.

SUMMARY

An aspect relates to a phosphorus-free corrosion and scale inhibitor used in circulating cooling water of central air conditioning, characterized by its simple preparation method, convenience to purchase raw materials, low cost and remarkable effect. Its convenient use can be illustrated by the fact that the formula reagent can be added into the circulating cooling water system directly or by using an automatic dosing device after being diluted with water.

Embodiments of the invention also provide a preparation method of the phosphorus-free corrosion and scale inhibitor used in circulating cooling water of central air conditioning.

In order to achieve the purposes and solve the technical problems, the following technical scheme is adopted in the invention. According to the invention, the phosphorus-free corrosion and scale inhibitor used in circulating cooling water of central air conditioning comprises tourmaline, green corrosion and scale inhibitor and zinc salt, wherein the content of the tourmaline is 5-500 g/t (calculated based on solid form); the content of the green corrosion and scale inhibitor is 5-50 g/t (calculated based on liquid form); the content of the zinc salt is 0.2-0.8 g/t (calculated based on solid form).

The tourmaline in the phosphorus-free corrosion and scale inhibitor disclosed by the invention may be dravite, schorlite, elbaite, manganese tourmaline, uvite or the like.

The zinc salt in the phosphorus-free corrosion and scale inhibitor disclosed by the invention is any one or a mixture of zinc sulfate and zinc chloride.

The phosphorus-free corrosion and scale inhibitor disclosed by the invention further comprises 0.2-2 g/t (calculated based on solid form) of benzotriazole.

The content of the green corrosion and scale inhibitor in the phosphorus-free corrosion and scale inhibitor disclosed by the invention is 6-16 g/t (calculated based on liquid form).

According to the phosphorus-free corrosion and scale inhibitor disclosed by the invention, the concentration rate of the circulating cooling water of central air conditioning is 3-12.

In addition, the invention further discloses a preparation method of the phosphorus-free corrosion and scale inhibitor used in circulating cooling water of central air conditioning. The preparation method comprises the following steps:

1) dissolving 5-50 g of a polymer of any one, or two or three of polyaspartic acid, polyepoxysuccinic acid and polymaleic acid into 1000 ml of deionized water, and adding 0.2-0.8 g of the zinc salt;

2) heating it to 55-75° C., performing a heat preservation reaction on the above polymer solution for 4-6 hours under the condition of stirring, and then cooling, thereby obtaining a phosphorus-free corrosion and scale inhibitor mother liquor;

3) in 1 L of the circulating cooling water of central air conditioning, firstly feeding 6-600 mg of the tourmaline directly or through a recyclable tourmaline dosing device, and subsequently adding 1 g of the phosphorus-free corrosion and scale inhibitor mother liquor directly.

In step 1), 0.2-2 g of benzotriazole is added into the corrosion and scale inhibitor for copper-containing devices.

In step 2), the optimal temperature is 65° C., and the optimal reaction time is 5 hours.

By adopting the above technical scheme, the phosphorus-free corrosion and scale inhibitor of the invention has the following advantages and beneficial effects:

1) the corrosion and scale inhibitor provided by the invention is free of phosphorus, so both calcium phosphate scale and water body eutrophication can be prevented;
2) the corrosion and scale inhibitor provided by the invention has no toxic formula such as chromate or nitrite, thus being safe to use;
3) the use concentration of zinc ions is less than the national emission standard (2 mg/L);
4) the polyaspartic acid, the polyepoxysuccinic acid and the like in the green corrosion and scale inhibitor are non-toxic, environment-friendly products and do no harm to a water body;
5) a remarkable scale inhibition synergistic effect can be achieved for the tourmaline, the polyaspartic acid, the polyepoxysuccinic acid, the zinc ions and the like, and moreover the use concentration can be greatly reduced;
6) corrosion and scale inhibitors such as expensive molybdates are not used, so the phosphorus-free corrosion and scale inhibitor of the invention is of high quality and reasonable price, avoiding the complex processes of calcium supplement, alkali supplement, pH value adjustment and the like, which makes for its popularization and application.

DETAILED DESCRIPTION OF THE EMBODIMENTS

A phosphorus-free corrosion and scale inhibitor used in circulating cooling water of central air conditioning, which consists of tourmaline, green corrosion and scale inhibitor, zinc salt and the like, wherein the tourmaline may be dravite, schorlite, elbaite, manganese tourmaline, uvite or the like. The content of the tourmaline is 5-500 g/t (calculated based on solid form, i.e. the solid addition amount in each ton of water); the green corrosion and scale inhibitor is any one, two and three of polyaspartic acid, polyepoxysuccinic acid and polymaleic acid. The content of the green corrosion and scale inhibitor is 5-50 g/t (calculated based on solid form, i.e. the solid addition amount in each ton of water); the content of the zinc salt is 0.2-0.8 g/t (calculated based on solid form zinc salt, i.e. the solid zinc salt addition amount in each ton of water). The zinc salt is selected from any one or a mixture of two of zinc sulfate and zinc chloride.

Copper corrosion can be effectively inhibited by adding 0.2-2 g/t (calculated based on solid form, i.e. the solid addition amount in each ton of water) of benzotriazole into the copper-containing devices.

Embodiment 1

A phosphorus-free corrosion and scale inhibitor used in circulating cooling water of central air conditioning, 20 g of polyaspartic acid, 12 g of polyepoxysuccinic acid and 0.6 g of $ZnSO_4$ solid are sequentially dissolved into 1000 ml of deionized water that define a polymer solution, which is heated to 65° C., performed a heat preservation reaction for 5 hours under the condition of stirring, and then cooled, thereby the phosphorus-free corrosion and scale inhibitor mother liquor is obtained.

In 1 L of the circulating cooling water of central air conditioning, firstly 100 mg of the tourmaline is fed directly or through a recyclable tourmaline dosing device, and secondly 1 g of the phosphorus-free corrosion and scale inhibitor mother liquor is added directly. The tourmaline can be recycled.

Embodiment 2

A phosphorus-free corrosion and scale inhibitor used in circulating cooling water of central air conditioning, 18 g of polyaspartic acid, 12 g of polymaleic acid and 0.6 g of $ZnSO_4$ solid are sequentially dissolved into 1000 ml of deionized water that define a polymer solution, which is heated to 65° C., performed a heat preservation reaction for 5 hours under the condition of stirring, and then cooled, thereby the phosphorus-free corrosion and scale inhibitor mother liquor is obtained.

In 1 L of the circulating cooling water of central air conditioning, firstly 100 mg of the tourmaline is fed directly or through the recyclable tourmaline dosing device, and secondly 1 g of the phosphorus-free corrosion and scale inhibitor mother liquor is added directly. The tourmaline can be recycled.

Embodiment 3

A phosphorus-free corrosion and scale inhibitor used in circulating cooling water of central air conditioning, 15 g of polyaspartic acid, 10 g of polyepoxysuccinic acid, 10 g of polymaleic acid and 0.6 g of $ZnSO_4$ solid are sequentially dissolved into 1000 ml of deionized water that define a polymer solution, which is heated to 65° C., performed a heat preservation reaction for 5 hours under the condition of stirring, and then cooled, thereby the phosphorus-free corrosion and scale inhibitor mother liquor is obtained.

In 1 L of the circulating cooling water of central air conditioning, firstly 120 mg of the tourmaline is fed directly or through the recyclable tourmaline dosing device, and secondly 1 g of the phosphorus-free corrosion and scale inhibitor mother liquor is added directly. The tourmaline can be recycled.

Embodiment 4

A phosphorus-free corrosion and scale inhibitor used in circulating cooling water of central air conditioning, green corrosion and scale inhibitors, i.e. 15 g of polyaspartic acid, 12 g of polyepoxysuccinic acid, 0.6 g of $ZnSO_4$ solid and 1.8 g of benzotriazole are sequentially dissolved into 1000 ml of deionized water that define a polymer solution, which is heated to 65° C., performed a heat preservation reaction for 5 hours under the condition of stirring, and then cooled, thereby the phosphorus-free corrosion and scale inhibitor mother liquor is obtained.

In 1 L of the circulating cooling water of central air conditioning, firstly 120 mg of the tourmaline is feeded directly or through the recyclable tourmaline dosing device, and secondly 1 g of the phosphorus-free corrosion and scale inhibitor mother liquor is added directly. The tourmaline can be recycled.

In the embodiments 1-4 of the invention, a carbon steel test piece is made of #20 steel, and the specification is 500 mm*25 mm*2 mm. The corrosion inhibition performance is tested according to the National Standards of the People's Republic of China GB/T18175-2000, Determination of Corrosion Inhibition Performance of Water Treatment Agents-Rotation Specimen Method, a rotating hanging sample corrosion analyzer is adopted for corrosion inhibition test, the temperature is 45° C., and the rotation speed is 75 r/min. The scale inhibition performance is tested according to the National Standards of the People's Republic of China GB/T16632-2008, Determination of Scale Inhibition Performance of Water Treatment Agents-Calcium Carbonate Precipitation Method.

Water with pH of 6.8, the electric conductivity of 134 μs/L, the total hardness (in $CaCO_3$) of 48 mg/L, the total alkalinity (in $CaCO_3$) of 22 mg/L and 16 mg/L of chloridion ($Cl^-$) is taken from a municipal water supply station in Guangzhou to prepare test water with the concentration rate of 5 (the concentration rate of the circulating cooling water is 3-12), pH is 7.6, the total hardness (in $CaCO_3$) is 242 mg/L, and the total alkalinity (in $CaCO_3$) is 108 mg/L.

The corrosion and scale inhibitor provided by the invention is excellent in performance, free of phosphorus, good in biodegradability, free of water body eutrophication, and has wide application prospects and high economic values.

The invention provides a simple formula and a simple operation method, and by adopting the simple formula and the simple operation method, not only can requirements of the circulating cooling water system on corrosion and scale inhibition be met, but also the risk of environmental pollution caused by phosphorus discharge from the circulating cooling water system can be eliminated.

The content above is only relatively optimal embodiments of the invention and does not limit the invention in any mode, and content within the technical scheme of the invention, any simple modification and equivalent variation and embellishment to the embodiments according to the technical essence of the invention all belong to the technical scheme of the invention.

What is claimed is:

1. A phosphorus-free corrosion and scale inhibitor used in circulating cooling water of central air conditioning, comprising tourmaline, green corrosion and scale inhibitor and zinc salt, wherein the green corrosion and scale inhibitor is at least one of: polyaspartic acid, polyepoxysuccinic acid, polymaleic acid, and a combination thereof, further wherein a content of the tourmaline is 5-500 grams per metric ton (g/t) calculated based on solid form, a content of the green corrosion and scale inhibitor is [5-50 g/t] 5-50 grams per metric ton (g/t) calculated based on liquid form, and a content of the zinc salt is [0.2-0.8 g/t] 0.2-0.8 grams per metric ton (g/t) calculated based on solid form.

2. The phosphorus-free corrosion and scale inhibitor used in circulating cooling water of central air conditioning according to claim 1, wherein the tourmaline is at least one of dravite, schorlite, elbaite, manganese tourmaline, and uvite.

TABLE 1

List of corrosion and scale inhibition performance of embodiments

| Embodiment | Tourmaline (mg/L) | Polyaspartic acid (mg/L) | Polyepoxysuccinic acid (mg/L) | Polymaleic acid (mg/L) | Zinc salt (mg/L) | Benzotriazole (mg/L) | Corrosion rate mm/a | Scale inhibition rate % |
|---|---|---|---|---|---|---|---|---|
| 1 | 100 | 20 | 12 | 0 | 0.6 | 0 | 0.056 | 89 |
| 2 | 100 | 18 | 0 | 12 | 0.6 | 0 | 0.048 | 92 |
| 3 | 120 | 15 | 10 | 10 | 0.6 | 0 | 0.032 | 98 |
| 4 | 120 | 15 | 12 | 0 | 0.6 | 1.8 | 0.003 | 97 |

In the embodiments 1-4 in the table 1, the tourmaline, the polyaspartic acid, the polyepoxysuccinic acid, the polymaleic acid, the zinc sulfate and the like are mixed in different ratios, and thus multi-component composite formulae with synergistic effect can be obtained. Corrosion rates obtained from hanging sample corrosion tests (carbon steel corrosion tests in embodiments 1-3 and copper alloy corrosion tests in embodiment 4) show that:

Under the working condition of simulated circulating cooling water, the composite formulae all have good corrosion inhibition performance, the corrosion rates are all less than 0.075 mm/a, and the corrosion is less than the corrosion rate upper limit 0.075 mm/a (the corrosion rate upper limit 0.005 mm/a of copper alloy) of the carbon steel devices according to GB 50050-2007 Code for Design of Industrial Recirculating Cooling Water Treatment, and the scale inhibition performance can also meet provisions of the national standard.

3. The phosphorus-free corrosion and scale inhibitor used in circulating cooling water of central air conditioning according to claim 1, wherein the zinc salt is any one or a mixture of zinc sulfate and zinc chloride.

4. The phosphorus-free corrosion and scale inhibitor used in circulating cooling water of central air conditioning according to claim 1, wherein the phosphorus-free corrosion and scale inhibitor further comprises 0.2-2 g/t calculated based on solid form of benzotriazole.

5. The phosphorus-free corrosion and scale inhibitor used in circulating cooling water of central air conditioning according to claim 1, wherein the content of the green corrosion and scale inhibitor is 6-16 g/t calculated based on liquid form.

6. The phosphorus-free corrosion and scale inhibitor used in circulating cooling water of central air conditioning according to claim 1, wherein a concentration rate of the circulating cooling water of central air conditioning is 3-12.

7. A preparation method of the phosphorus-free corrosion and scale inhibitor used in circulating cooling water of central air conditioning, wherein the preparation method comprises the following steps:
1) dissolving 5-50 g of a polymer of any one, or two or three of polyaspartic acid, polyepoxysuccinic acid and polymaleic acid into 1000 ml of deionized water, and adding 0.2-0.8 g of the zinc salt;
2) heating to 55-75° C., and performing a heat preservation reaction on the above polymer solution for 4-6 hours under the condition of stirring, and then cooling, thereby obtaining a phosphorus-free corrosion and scale inhibitor mother liquor; and
3) in 1 L of the circulating cooling water of central air conditioning, firstly feeding 6-600 mg of the tourmaline directly or through a recyclable tourmaline dosing device, and subsequently adding 1 g of the phosphorus-free corrosion and scale inhibitor mother liquor directly.

8. The preparation method of the phosphorus-free corrosion and scale inhibitor used in circulating cooling water of central air conditioning according to claim 7, wherein in step 1), 0.2-2 g of benzotriazole is added into the corrosion and scale inhibitor for copper-containing devices.

9. The preparation method of the phosphorus-free corrosion and scale inhibitor used in circulating cooling water of central air conditioning according to claim 7, wherein in step 2), the optimal temperature is 65° C., and the optimal reaction time is 5 hours.

\* \* \* \* \*